2,929,848

3,4-DIHYDROXYPHENYL ISOPROPYL KETONE

Eugene H. Woodruff and Patrick H. Seay, Kalamazoo, Mich., assignors to The Upjohn Company, Kalamazoo, Mich., a corporation of Michigan No Drawing. Application October 11, 1957
Serial No. 689,475

1 Claim. (Cl. 260—592)

This invention relates to a composition of matter and is more particularly concerned with 3,4-dihydroxyphenyl isopropyl ketone.

The novel compound of the invention is useful for relieving dysmenorrhea, threatened abortion, and like conditions for which a uterine relaxant is signified. It also is a muscle relaxant. It is also useful as an intermediate for preparing alkyl- and alkenylcatechols having antiseptic and germicidal and antioxidant properties. Thus by catalytic hydrogenation or chemical reduction of the keto group it is converted into 4-isobutylcatechol, and by reduction with lithium aluminum hydride followed by dehydration it is converted into 4-(2-methylpropenyl)-catechol.

The novel compound of the invention can be prepared by acylating catechol with isobutyryl chloride in a suitable solvent such as chlorobenzene in the presence of aluminum chloride or like Friedel-Crafts catalyst. The process appears to proceed through the catechol ester followed by a Fries rearrangement. If desired, the diester can be formed and isolated, and then disproportionated with catechol in the presence of aluminum chloride (Fries rearrangement) to give the desired 3,4-dihydroxyphenyl isopropyl ketone. Alternatively, the catechol and the isobutyryl chloride are reacted and the reaction mixture then treated with aluminum chloride without isolation of the ester. The novel compound of the invention can also be prepared by demethylating 3,4-dimethoxyphenyl isopropyl ketone which is prepared by acylating veratrole with isobutyryl chloride in the presence of aluminum chloride. The demethylation can be effected by heating with hydrochloric or hydrobromic acid, or pyridine hydrochloride.

The novel compound of the invention is differentiated from the known 3,4-dihydroxyphenyl n-propyl ketone by its effect on uterine motility and blood pressure. For example, the compound of the invention causes relaxation of the uterus of a cat for thirty minutes without effect on the blood pressure when given intravenously at one and two milligrams per kilogram, and for two hours without effect on the blood pressure when given intraduodenally at twenty milligrams per kilogram, whereas the n-propyl isomer gives no relaxation when administered at one and two milligrams per kilogram intravenously, or at twenty milligrams per kilogram intraduodenally. The n-propyl isomer, moreover, causes a substantial drop in blood pressure in both cases. Another known isomer, namely, 2,4-dihydroxyphenyl isopropyl ketone, is also inactive at one and two milligrams per kilogram intravenously and twenty milligrams per kilogram intraduodenally. The novel compound of the invention therefore has new and unexpected and advantageous properties as compared with the prior art compounds most analogous to it.

The invention may be more fully understood by reference to the following examples which are given by way of illustration and are not to be construed as limiting. Unless otherwise specified, parts are by weight.

EXAMPLE 1

A. *Catechol diisobutyrate*

Isobutyryl chloride (106.5 grams; one mole) was added to catechol (55 grams; 0.5 mole) over a period of one hour, during which time the reaction mixture liquefied. This mixture, after being allowed to stand at about 25 degrees centigrade for three days, was distilled under reduced pressure. There was thus obtained 119 grams (95.2 percent yield) of oily catechol diisobutyrate having a boiling point of 158-162 degrees centigrade at twelve millimeters mercury pressure.

B. *Amorphous 3,4-dihydroxyphenyl isopropyl ketone*

A mixture of 52.4 grams (0.476 mole) of catechol and 119.0 grams (0.476 mole) of the catechol diisobutyrate of part A was heated to approximately seventy degrees centigrade. The resulting solution was added during forty minutes to a stirred mixture of 300 milliliters of chlorobenzene and 276 grams (2.07 moles) of anhydrous aluminum chloride; the temperature of the mixture increased from thirty degrees centigrade to eighty degrees centigrade during this addition. The reaction mixture was heated to 110 degrees centigrade and maintained at that temperature for three hours. It was then cooled to ninety degrees centigrade and poured into a mixture of ice and concentrated hydrochloric acid. The mixture, after being subjected to steam distillation to remove chlorobenzene, was cooled to about 25 degrees centigrade, whereupon 3,4-dihydroxyphenyl isopropyl ketone was obtained as an amorphous solid.

C. *Crystalline 3,4-dihydroxyphenyl isopropyl ketone*

The amorphous product of part B was extracted with chlorobenzene and the extract was distilled. Chlorobenzene and unchanged starting material were separated in the early fractions, and the desired 3,4-dihydroxyphenyl isopropyl ketone was then obtained as a fraction weighing thirty grams and having a boiling point of 176-180 degrees centigrade at forty microns mercury pressure. The compound crystallized upon being allowed to cool. It was twice recrystallized from toluene to give a white crystalline product melting at 94.5-95.5 degrees centigrade.

*Analysis.*—Calcd. for $C_{10}H_{12}O_3$: C, 66.65; H, 6.71. Found: C, 66.27; H, 6.56.

EXAMPLE 2

A. *Oily 3,4-dihydroxyphenyl isopropyl ketone*

To a two-liter, three-necked flask equipped with stirrer, reflux condenser, addition funnel, and thermometer, containing 83 grams (0.75 mole) of catechol and 330 milliliters of chlorobenzene, there was added 100 grams (0.94 mole) of isobutyryl chloride dropwise with stirring. The mixture was then heated at 55 degrees centigrade for one-half hour and cooled to twenty degrees centigrade. There was then added 213 grams (1.6 moles) of aluminum chloride in small portions with stirring, the addition being just fast enough so that the reaction temperature was 50-60 degrees centigrade. The reaction mixture was then heated with stirring at 110-115 degrees centigrade for three hours, cooled to 80 degrees centigrade, and carefully poured over a mixture of 300 milliliters of concentrated hydrochloric acid and 500 grams of cracked ice with stirring to maintain a temperature of 70-80 degrees centigrade. After standing overnight, the layers were separated, and the chlorobenzene layer was washed with two 500-milliliter portions of water. Water (300 milliliters) was added to the chlorobenzene solution and the chlorobenzene was removed by steam distillation. The aqueous mixture thus obtained was cooled and extracted with two 200-milliliter portions of n-butyl alcohol. The combined n-butyl alcohol extracts were dried over fifty grams of anhydrous sodium sulfate, filtered, and distilled using water-aspirator vacuum to remove the n-butyl alcohol. The residue was vacuum distilled and the first main fraction consisted of monoisobutyl ester of catechol and traces of catechol, boiling point 120–130 degrees centigrade at 13 millimeters mercury pressure. When the oil bath temperature reached 210 degrees centigrade and no more distillate came over, receiving flasks were changed and the distillation was continued using a high vacuum pump. The fraction boiling at 150–155 degrees centigrade at 0.05 millimeter mercury pressure which was nearly pure 3,4-dihydroxyphenyl isopropyl ketone, on cooling yielded 55.4 grams of a yellow, viscous oil.

B. *Crystalline 3,4-dihydroxyphenyl isopropyl ketone*

The yellow viscous oil obtained in part A was mixed with 100 milliliters of toluene, seeded with crystalline 3,4-dihydroxyphenyl isopropyl ketone, and scratched with a glass rod to cause crystallization to a white solid. There was thus obtained 52.8 grams (39 percent) of white, crystalline 3,4-dihydroxyphenyl isopropyl ketone. The product thus obtained has a melting point of 94–96 degrees centigrade; it has a solubility in water of not more than about one percent; it is very soluble in alcohol, and is soluble up to about ten percent in twenty-five percent aqueous alcohol; it is soluble in propylene glycol; slightly soluble in glycerol; insoluble in corn oil; and is very stable in elixir compositions. Being a solid it can advantageously be formulated in tablets, plain, sugar-coated, or enteric; or filled in hard gelatin capsules. Moreover, because of its solubility in aqueous ethanol, it can also be effectively formulated as an elixir or as a sterile solution for injection. It can also be formulated as liquid suspension for oral use.

It is to be understood that the invention is not to be limited to the exact details of operation or exact compounds shown and described, as obvious modifications and equivalents will be apparent to one skilled in the art, and the invention is therefore to be limited only by the scope of the appended claim.

We claim:

3,4-dihydroxyphenyl isopropyl ketone.

References Cited in the file of this patent
UNITED STATES PATENTS 2,078,205   Miller et al. _____ Apr. 20, 1957